UNITED STATES PATENT OFFICE.

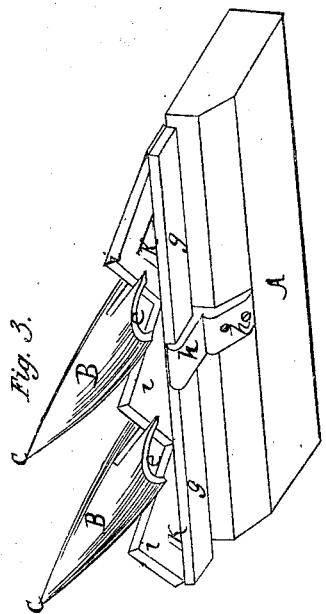

SALEM T. LAMB, OF NEW WASHINGTON, INDIANA.

IMPROVEMENT IN THE CUTTING APPARATUS OF HARVESTING-MACHINES.

Specification forming part of Letters Patent No. 30,231, dated October 2, 1860.

*To all whom it may concern:*

Be it known that I, SALEM T. LAMB, of New Washington, in the county of Clarke and State of Indiana, have invented certain new and useful Improvements in the Cutting Apparatus of Harvesters; and I do hereby declare the following to be a full, clear, and exact description of the construction and operation of the same, reference being had to the accompanying drawings, making a part of this specification, in which—

Figure 1 represents in perspective a section or portion of the finger-beam with the guards and cutter arranged upon it. Fig. 2 represents a transverse section through one of the guards, the cutting apparatus, and the finger-beam. Fig. 3 represents a perspective view from the under part of the finger-beam, or a view of Fig. 1 if turned upside down.

Similar letters of reference, where they occur in the several figures, denote like parts of the apparatus in all of them.

The object of my invention is to avoid the clogging and gumming up of the cutting apparatus in the guards or supports. It is impossible to prevent the short grass from coming in contact with the cutters and their bar, and the only remedy that can be devised for obviating the evil of clogging is to afford a certain carrying off or removing of this clogging matter. I do not prevent the short grass from working back, but I get rid of it before it reaches the cutter-bar supports, and hence avoid its evil consequences. Many devices for effecting this purpose have been invented and patented. They are, however, only approximations. The evil still exists. My invention I deem better than any of the others of which I have knowledge, and while there are some which have very much the general appearance of my construction, yet they do not effect all the purposes and ends which my construction does.

To enable others skilled in the art to make and use my invention, I will proceed to describe the same with reference to the drawings.

A represents the finger-beam, and B the guards. The guards have a projection, $a$, upon their upper portions, which gives them strength, and over which the grain or grass will easily pass. They have also flanges $b\ b$, which, when the guards are arranged on the finger-beam, abut up tight against each other. These joints should be nicely fitted together, as they thus will afford additional strength and rigidity to the finger-beam, any tendency of the finger-beam to sag being counteracted by the close metallic connections throughout its length, for the sagging of the bar would only the more tightly close these joints, and, being on top of the finger-bar, form, as it were, a rigid arch to hold themselves and the bar up. The same flanges and metallic joints below the finger-beam would have no such effect, as the tendency of the finger-bar to sag would open the joints, and there would be no counteracting resistance, as there is when placed on top of the beam. These flanges project forward and downward until they come close to the cutters, their front line being at the line of the rear corners of the cutters, or a little in front of the front edge of the cutter-bar. The upper part and lower part of the guards meet in a point, $c$, and much of the space inclosed by them is open, as seen at $d$, Fig. 2. The under part of the guard does not extend back to the cutter-bar, but falls short of it, so that any grass or other material that may work into the guard will fall into its concave and inclined open space and drop out at $e$, while the grass and other material that works into the guard on top of the cutters has also abundant open space at $f$ to pass out without touching any of the bearings, where it is most likely to stick.

The cutter-bar $g$ does not touch the guards, but has its supports $h$ independent of the guards. Three of these supports will be found sufficient for an ordinary cutter-bar, and they are fitted and fastened to the front and under portion of the finger-beam, as shown at Fig. 2. These bearers $h$ being independent of the guards, and so far in rear of the guards as that the short grass, &c., cannot reach them, (as it drops out before it reaches them,) no clogging can take place, and if by any possibility the clogging matter could get upon the bearers where the cutter-bar works, there being so little bearing-surface—viz., three narrow points—it would do little or no injury.

$i$ are the cutters. They are placed on top of the cutter-bar $g$, and may have openings $k$ in them behind their points, except in those which vibrate past the bearers. These latter ones should have no opening in them, as they would tend to let the short grass into or on the bearer, the object of the openings being to present their edges to work out any grass that might work under or stick to the edges of the flanges of the guards where they approach the cutters.

By this construction and arrangement I avoid any injurious clogging.

The bearers $h$ may be cast in one single piece, and so as to afford both vertical and horizontal support to the cutter-bar on all four of its sides, and yet the cutter-bar be easily slipped in and out with its cutters on it.

Having thus fully described the nature and object of my invention, what I claim therein as new, and desire to secure by Letters Patent, is—

A cutting apparatus composed of the following elements, viz: a guard, hollow above and below the cutter-blades, opening above, below, and in rear of the cutter-bar, and flanges on top, extending in a curve forward to the cutters and laterally to each other, to form a line in close proximity to the cutter-blades, and a cutter-bar supported on all four sides on independent bearers, all substantially as and for the purpose described.

SALEM T. LAMB.

Witnesses:
A. B. STOUGHTON,
THOS. H. UPPERMAN.